(12) United States Patent
Tsuji

(10) Patent No.: US 12,002,279 B2
(45) Date of Patent: Jun. 4, 2024

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Ryosuke Tsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/152,052

(22) Filed: Jan. 9, 2023

(65) Prior Publication Data

US 2023/0148125 A1    May 11, 2023

Related U.S. Application Data

(63) Continuation of application No. 17/132,910, filed on Dec. 23, 2020, now Pat. No. 11,575,826.

(30) Foreign Application Priority Data

Dec. 26, 2019 (JP) .................................. 2019-236967

(51) Int. Cl.
*G06V 40/10* (2022.01)
*G06V 10/20* (2022.01)
*G06V 10/762* (2022.01)
*H04N 23/611* (2023.01)
*H04N 23/67* (2023.01)

(52) U.S. Cl.
CPC .......... *G06V 40/103* (2022.01); *G06V 10/255* (2022.01); *G06V 10/763* (2022.01); *H04N 23/611* (2023.01); *H04N 23/67* (2023.01)

(58) Field of Classification Search
CPC .. G06V 40/103; G06V 10/255; G06V 10/763; H04N 23/611; H04N 23/67; H04N 23/675; G06F 18/23213
See application file for complete search history.

(56) References Cited

U.S. PATENT DOCUMENTS

| 11,281,898 B2* | 3/2022 | Ding .......................... G06T 7/73 |
| 2013/0069867 A1* | 3/2013 | Watanabe ............. G06F 3/0482 |
| | | 345/156 |
| 2015/0092982 A1* | 4/2015 | Kang ........................ G06T 7/11 |
| | | 382/103 |
| 2016/0162057 A1* | 6/2016 | Chen ..................... G06F 3/0425 |
| | | 345/162 |
| 2021/0127068 A1* | 4/2021 | Nishiyama ................ G06T 7/73 |

FOREIGN PATENT DOCUMENTS

JP    2011130203 A    6/2011

\* cited by examiner

*Primary Examiner* — Hung H Lam
(74) *Attorney, Agent, or Firm* — Canon U.S.A., Inc. IP Division

(57) ABSTRACT

An image processing apparatus comprises an acquisition unit that acquires image data, an estimation unit that detects a predetermined subject from the image data and estimates posture information of the detected subject, and a determination unit that, in a case where a plurality of subjects are detected by the estimation unit, determines a main subject from the plurality of subject using feature vector of each of the subjects obtained from the posture information.

15 Claims, 4 Drawing Sheets

IMAGE PROCESSING APPARATUS AND METHOD, AND IMAGE CAPTURING APPARATUS

CROSS REFERENCE OF RELATED APPLICATIONS

This application is a continuation of U.S. patent application Ser. No. 17/132,910, filed Dec. 23, 2020 which claims the benefit of Japanese Patent Application No. 2019-236967, filed Dec. 26, 2019, all of which are hereby incorporated by reference herein in its entirety.

BACKGROUND

Field of the Disclosure

The present disclosure relates to an image processing apparatus and method, and an image capturing apparatus, and more particularly to a technique for detecting a subject in a captured image.

Description of the Related Art

Conventionally, various techniques have been proposed in which an image capturing apparatus such as a digital camera detects a subject in an image and uses the detected subject for image shooting control such as autofocus (hereinafter referred to as "AF"). The AF function using subject detection can support the user to shoot images by automating the selection of a focus adjustment area. Japanese Patent Laid-Open No. 2012-70222 discloses a technique of detecting a person's face using pattern matching and tracking the person's face while focusing on it.

Further, as a motion recognition technique for recognizing a plurality of people, Japanese Patent Laid-Open No. 2011-100175 discloses a technique of detecting and tracking a subject corresponding to a person whose feature amount of his/her trajectory such as a moving distance satisfies a specific condition by using images of a plurality of continuous frames.

However, in the method of Japanese Patent Laid-Open No. 2011-100175, in a scene where a plurality of people exist, the determination is performed based on the feature amounts of the people's trajectories obtained from images of a plurality of frames, so that a determination time corresponding to at least a plurality of frames is necessary. In addition, since it is necessary to process the images of the plurality of frames, there is a problem that the processing load is large.

SUMMARY

The present disclosure has been made in consideration of the above situation, and improves efficiency in determining a main subject among a plurality of subjects as well as improves accuracy of the determination.

According to the present disclosure, provided is an image processing apparatus comprising: an acquisition unit that acquires image data; an estimation unit that detects a predetermined subject from the image data and estimates posture information of the detected subject; and a determination unit that, in a case where a plurality of subjects are detected by the estimation unit, determines a main subject from the plurality of subject using feature vector of each of the subjects obtained from the posture information, wherein each unit is implemented by one or more processors, circuitry or a combination thereof.

Further, according to the present disclosure, provided is an image capturing apparatus comprising: the image processing apparatus that includes: an acquisition unit that acquires image data; an estimation unit that detects a predetermined subject from the image data and estimates posture information of the detected subject; and a determination unit that, in a case where a plurality of subjects are detected by the estimation unit, determines a main subject from the plurality of subject using feature vector of each of the subjects obtained from the posture information; an image sensing unit that outputs the image data; and a focus adjustment unit that perform focus adjustment based on the image data within an area of the main subject determined by the determination unit, wherein each unit is implemented by one or more processors, circuitry or a combination thereof.

Furthermore, according to the present disclosure, provided is an image processing method comprising: acquiring image data; detecting a predetermined subject from the image data and estimating posture information of the detected subject; and determining, in a case where a plurality of subjects are detected by the estimation unit, a main subject from the plurality of subject using feature vector of each of the subjects obtained from the posture information.

Further, according to the present disclosure, provided is a non-transitory computer-readable storage medium, the storage medium storing a program that is executable by the computer, wherein the program includes program code for causing the computer to execute an image processing method, the method comprising: acquiring image data; detecting a predetermined subject from the image data and estimating posture information of the detected subject; and determining, in a case where a plurality of subjects are detected by the estimation unit, a main subject from the plurality of subject using feature vector of each of the subjects obtained from the posture information.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Figure 1:
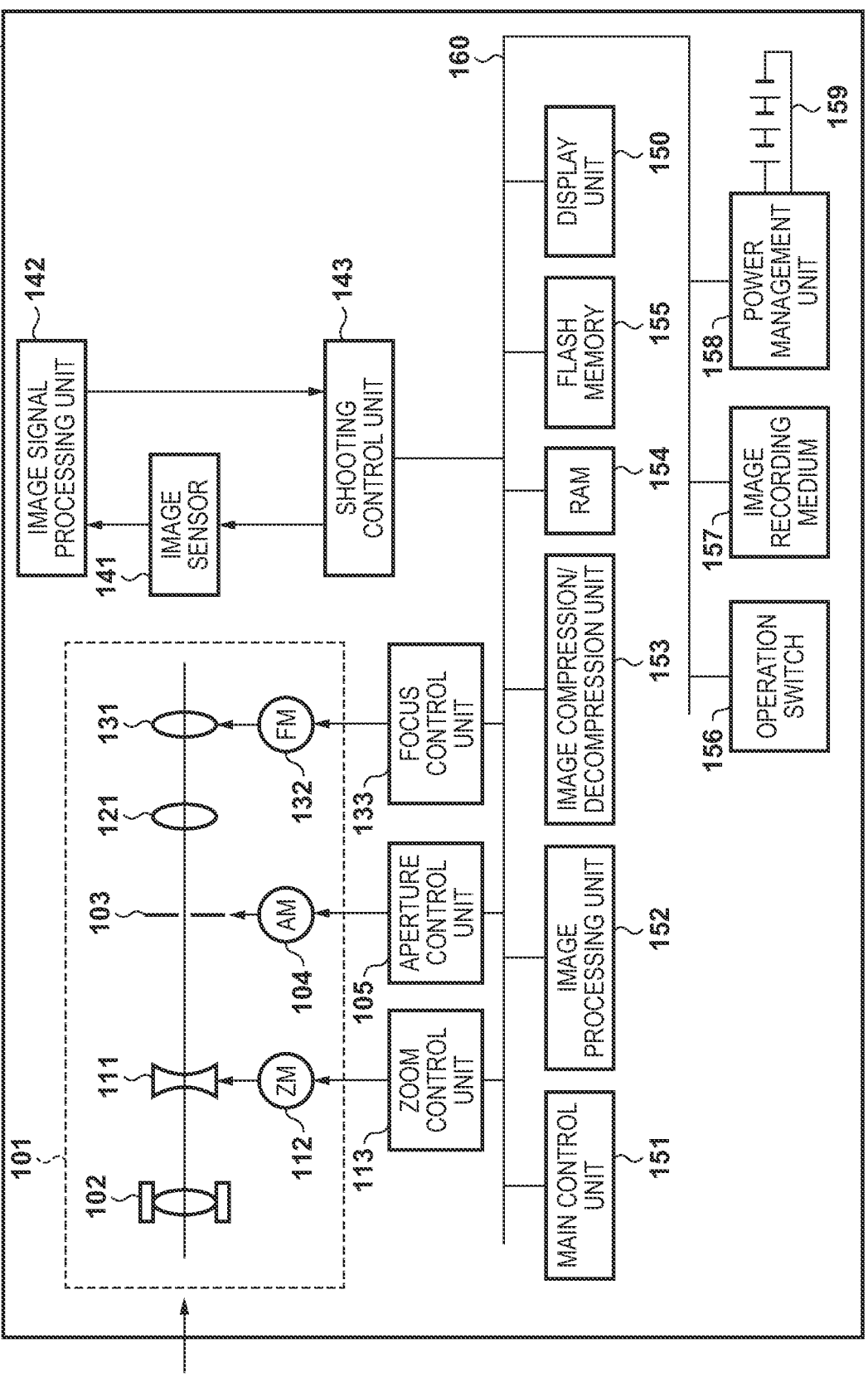
FIG. 1 is a block diagram showing a configuration example of an image capturing apparatus according to one or more aspects of the present disclosure

Hereinafter, embodiments will be described in detail with reference to the attached drawings. Note, the following embodiments are not intended to limit the scope of the claimed disclosure, and limitation is not made an disclosure that requires a combination of all features described in the embodiments. Two or more of the multiple features described in the embodiments may be combined as appropriate. Furthermore, the same reference numerals are given to the same or similar configurations, and redundant description thereof is omitted.

In the present embodiment, an image capturing apparatus will be described as an example of an apparatus to which the present disclosure can be applied, however, the present disclosure can be applied to an apparatus having a function capable of processing a captured image.

FIG. 1 is a block diagram showing a configuration example of an image capturing apparatus 100 according to the present embodiment. In the following description, it is assumed that subjects are people, and a main subject is a target of image shooting control among the subjects.

The image capturing apparatus 100 is, inter alia, a digital still camera, a video camera, or the like, that shoots a subject and records data of moving images and still images obtained by shooting the subject on various media such as tape, solid memory, optical disk, or magnetic disk. Each configuration in the image capturing apparatus 100 is connected via a bus 160 and controlled by a main control unit 151.

A lens unit 101 includes a fixed first lens group 102, a zoom lens 111, a diaphragm 103, a fixed third lens group 121, and a focus lens 131. An aperture control unit 105 adjusts the aperture diameter of the diaphragm 103 by driving the diaphragm 103 via an aperture motor (AM) 104 in accordance with a command from the main control unit 151 to control an amount of light at the time of image shooting. A zoom control unit 113 changes a focal length by driving the zoom lens 111 via a zoom motor (ZM) 112.

A focus control unit 133 controls a focus state by determining a drive amount of a focus motor (FM) 132 for driving the lens unit 101 in the optical axis direction based on a defocus amount, and driving the focus lens 131 via the focus motor 132. AF control is realized by controlling the movement of the focus lens 131 by the focus control unit 133 and the focus motor 132.

The focus lens 131 is a lens used for focus adjustment, and although it is simply shown as a single lens in FIG. 1, it is usually composed of a plurality of lenses.

An optical image of a subject formed on an image sensor 141 via the lens unit 101 is converted into an electric signal by photoelectric conversion in the image sensor 141. The image sensor 141 is provided with a light receiving element having m pixels in the horizontal direction and n pixels in the vertical direction, and each pixel includes a photoelectric conversion element or elements that photoelectrically convert the optical image of the subject into an electric signal. The electrical signal obtained by photoelectric conversion in the image sensor 141 is shaped into an image signal (image data) by an image signal processing unit 142, thereby an image is acquired.

The image data output from the image signal processing unit 142 is sent to a shooting control unit 143 and temporarily stored in a random access memory (RAM) 154. The image data stored in the RAM 154 is compressed by an image compression/decompression unit 153 and then recorded on an image recording medium 157. In parallel with this, the image data stored in the RAM 154 is sent to an image processing unit 152.

The image processing unit 152 applies predetermined image processing to the image data stored in the RAM 154. The image processing applied by the image processing unit 152 includes, but is not limited to, so-called development processing such as white balance adjustment processing, color interpolation (demosaic) processing and gamma correction processing, signal format conversion processing, and scaling processing. Further, the image processing unit 152 detects a predetermined subject using a known method, and determines a main subject based on posture information of the detected subject. The result of the determination process may be used for other image processing (for example, white balance adjustment processing). The image processing unit 152 stores the processed image data and information such as the positions of joints of each subject used for determining the main subject, the center of gravity and the positions of the face and eyes of the subject determined to be the main subject, as posture information as described later in the RAM 154.

An operation switch 156 is an input interface including a touch panel, buttons, and the like, and various operations can be performed by selecting and operating various function icons displayed on a display unit 150.

The main control unit 151 has one or more programmable processors such as a CPU and an MPU, and controls each unit by reading the program stored in a flash memory 155, for example, into the RAM 154 and executing the program, thereby functions of the image capturing apparatus 100 are realized. The main control unit 151 also performs AE processing that automatically determines exposure conditions (shutter speed or accumulation period, aperture value, sensitivity) based on information on luminance of the subject. The information on luminance of the subject can be obtained from the image processing unit 152, for example. The main control unit 151 can also determine the exposure conditions with reference to the area of a specific subject such as the face of a person.

In the flash memory 155, a control program necessary for the operation of the image capturing apparatus 100, parameters used for the operation of each part, and the like are recorded. When the image capturing apparatus 100 is started in response to the user's operation (when the power is turned on from the power off state), the control program and parameters stored in the flash memory 155 are loaded into a part of the RAM 154. The main control unit 151 controls the operation of the image capturing apparatus 100 according to the control program and parameters loaded in the RAM 154.

The focus control unit 133 performs AF control on the position of the main subject stored in the RAM 154. The aperture control unit 105 performs exposure control using the luminance value of a specific subject area. The display unit 150 displays an image, a detection result of the main subject, and so forth. A battery 159 is appropriately managed by a power management unit 158 to supply a stable power to the entire image capturing apparatus 100.

(Configuration of Image Processing Unit)

Next, a main subject determination in the present embodiment will be described with reference to FIGS. 2 to 5.

For example, in a group sport such as soccer, the probability that the player who shoots is the main subject (the subject that the user wants to shoot) is high. Further, the probability that the player is in the shooting posture which is different from postures of other players and referees is high. In addition, it is thought that the more the posture of a subject is different from the posture of a standard person, the higher the probability that the subject is the main subject becomes. In view of the above, in the present embodiment, when a plurality of subjects are detected, the main subject is determined by utilizing the difference in posture.

Figure 2:
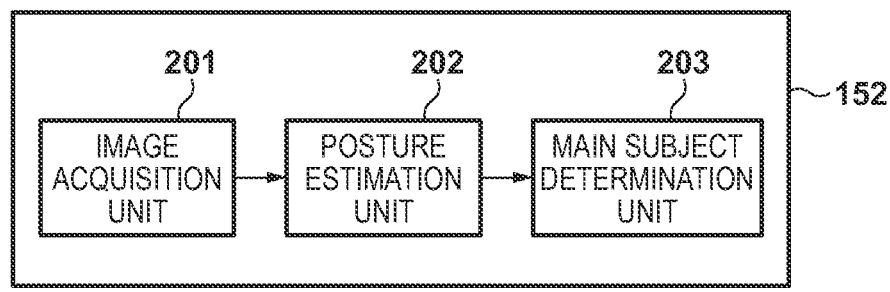
FIG. 2 is a block diagram showing a configuration example of an image processing unit according to one or more aspects of the present disclosure.

FIG. 2 is a block diagram showing a partial configuration of the image processing unit 152, and particularly shows a configuration related to the main subject determination.

An image acquisition unit 201 acquires an image from the shooting control unit 143.

Figure 3:
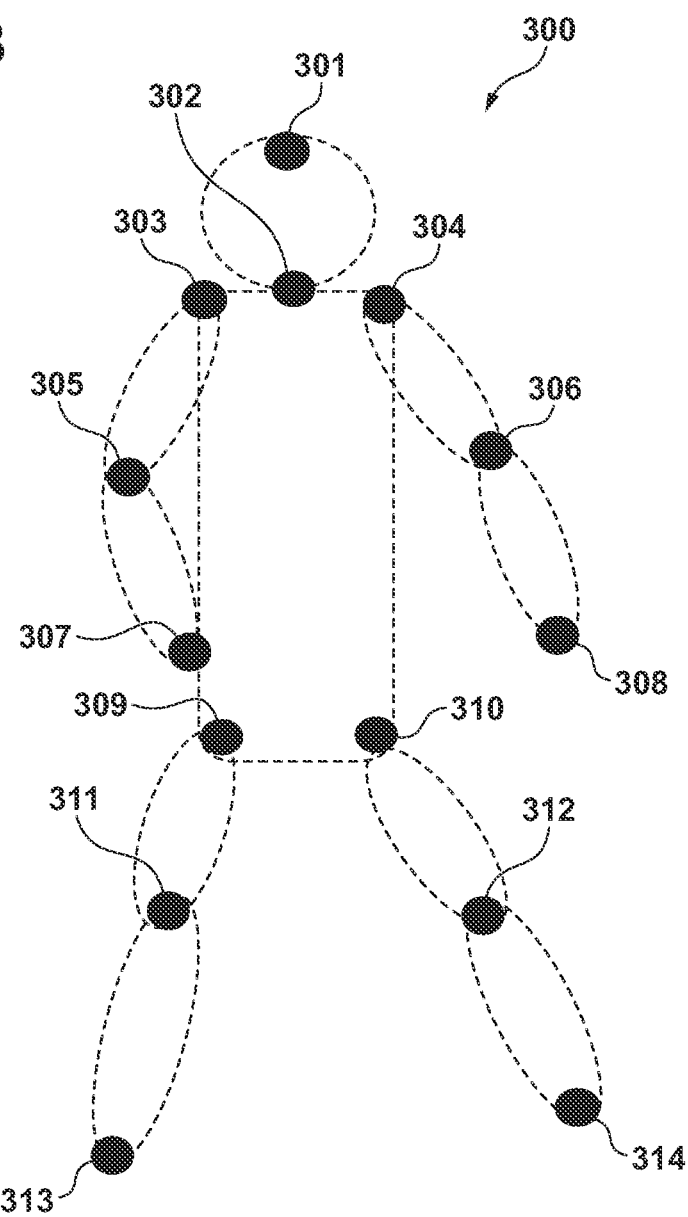
FIG. 3 is an explanatory diagram of posture information estimated by a posture estimation unit according to one or more aspects of the present disclosure.

A posture estimation unit 202 detects a subject from the image acquired by the image acquisition unit 201 and estimates the posture of the detected subject. FIG. 3 is a diagram showing an example of posture information estimated by the posture estimation unit 202, and joints of a subject 300 are indicated by 301 to 314. An example of acquiring the positions of the crown, neck, shoulders, elbows, wrists, hips, knees, and ankles as joints is shown, but it is possible that only some of these are acquired as the positions of joints, or that other positions of joints are acquired. Further, not only the positions of joints but also information such as lines connecting the joints may be used, and information to be used is not limited to these as long as it represents the posture of the subject. In the following, the case of acquiring the positions of joints as the posture information will be described. Any method may be used for posture estimation. As an example, the method described in "Realtime multi-person 2d pose estimation using part affinity fields. Proceedings of the IEEE Conference on Computer Vision and Pattern Recognition. 2017" by Cao, Zhe, et al. may be used.

Figure 4B:
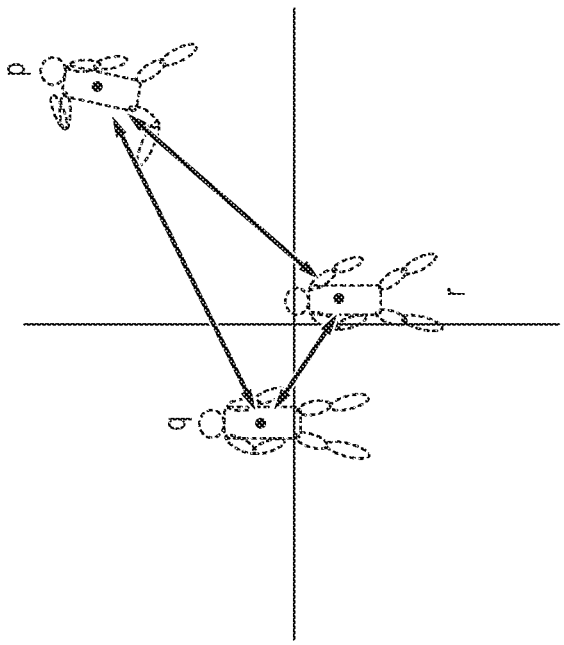
FIGS. 4A and 4B are conceptual diagrams of main subject determination processing by a main subject determination unit according to one or more aspects of the present disclosure.
Figure 4A:
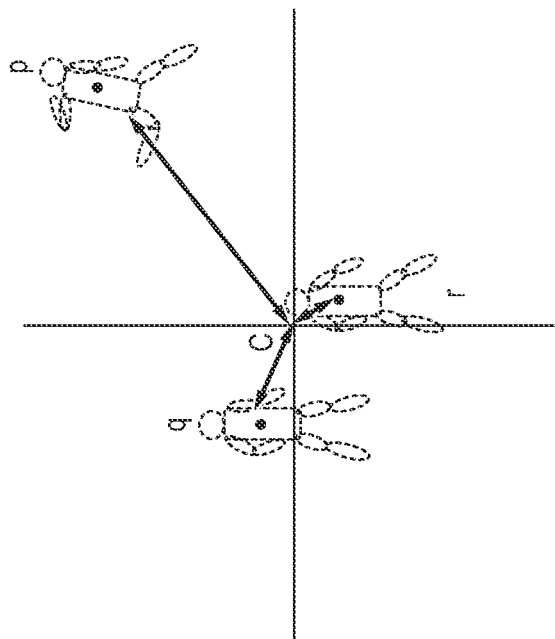

A main subject determination unit 203 determines the main subject based on the distance between the feature vectors extracted from the posture information of each subject estimated by the posture estimation unit 202. FIGS. 4A and 4B show conceptual diagrams of feature vectors used in determining the main subject. FIGS. 4A and 4B show the case where the subjects are three people, p, q, and r. First, the feature vector P of the subject p is expressed as shown in the equation (1).

$$P=\{p0, p1, p2, \ldots pn\} \quad (1)$$

p0 to pn represents vectors to the positions of joints, which are, for example, two-dimensional vectors from the crown 301 to each joints 302 to 314. Assuming that there are 14 joints as shown in FIG. 3, since there are 13 two-dimensional vectors, the feature vector is 26-dimensional. Note that FIGS. 4A and 4B are conceptual diagrams of the feature vectors, and two axes (horizontal axis i=0 and vertical axis i=1) of the 26-dimensional feature vector are described, wherein the number of dimensions is the number of axes of the feature vector.

Further, by normalizing the distance from the crown 301 to the neck 302, the influence of the size on the image of each subject is eliminated. The feature vectors Q and R of the subjects q and r are expressed in the same manner. The distance d(P, Q) between the feature vectors P and Q of the subject p and the subject q is calculated as the Euclidean distance by, for example, the equation (2).

$$d(P, Q)=\sqrt{\Sigma_{i=0}^{n}(p_i-q_i)^2} \quad (2)$$

Then, as shown in the equation (3), the sum of the distances between the feature vectors of the subjects is calculated for each subject.

$$d(P)=d(P, Q)+d(P, R) \quad (3)$$

Then, the subject having the largest sum of the distances between the feature vectors of the subjects, that is, the subject having the most different posture among the plurality of subjects is determined as the main subject. The above description corresponds to the example of FIG. 4A, and the subject p is selected as the main subject.

The method of determining a subject having the largest sum of the distance between the feature vectors of the subjects as the main subject has been described, but as shown in FIG. 4B, a subject having a largest distance between the feature vector and the predetermined center of a cluster obtained from the feature vectors in advance based on, for example, the K-Means method, may be selected as the main subject. If the predetermined center of the cluster is expressed by C={c0, c1, c2, . . . , cn}, then the distance between the feature vector of each subject and the center of the cluster the can be expressed by the following equation (4).

$$d(P)=d(P, C)=\sqrt{\Sigma_{i=0}^{n}(p_i-c_i)^2} \quad (4)$$

For example, the center C of the cluster will show the vector to each joint of a reference human body. Further, the distance of the feature vector may be calculated after dimensionally compressing the feature vector using principal component analysis or the like.

If there is a missing position of joint in the estimation by the posture estimation unit 202, the missing position of joint may be interpolated based on the estimated positions of other joints and the standard human joint model, or based on the positions of joins estimated from an image of a previous frame and the standard human joint model.

(Processing Flow)

Figure 5:
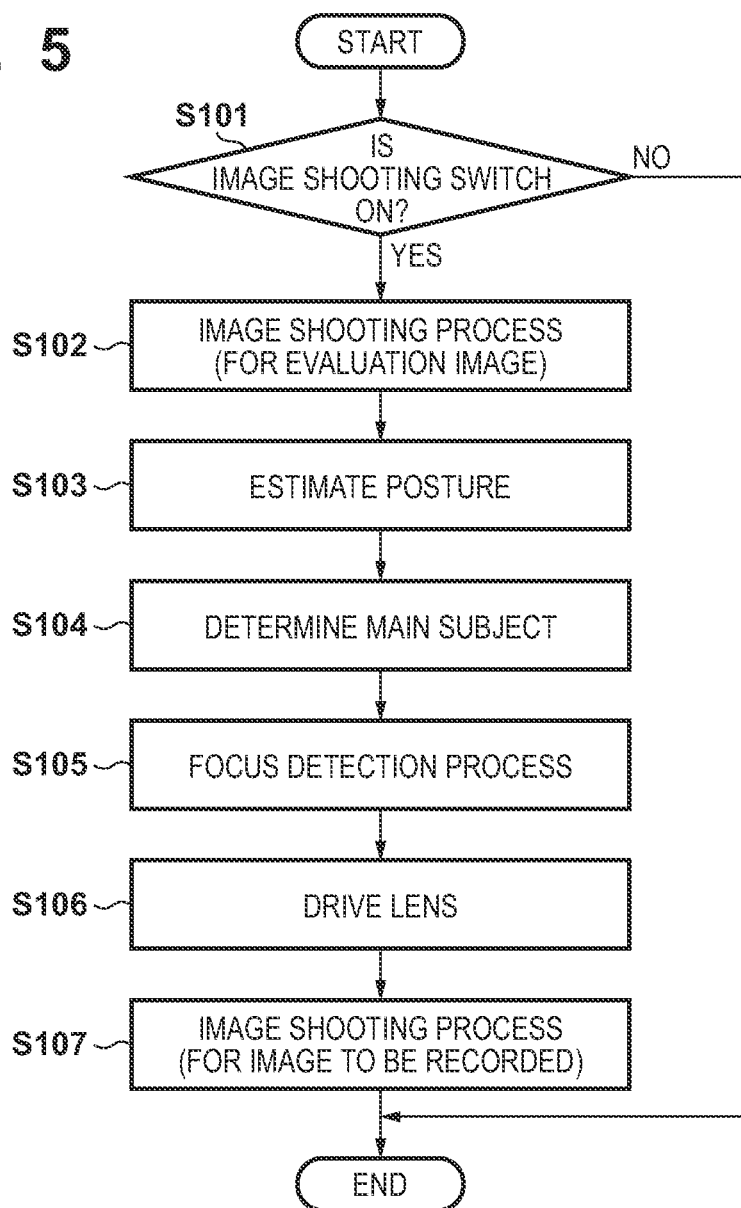
FIG. 5 is a flowchart showing an image shooting operation of the image capturing apparatus according to one or more aspects of the present disclosure.

Next, the image shooting operation accompanied by the main subject determination by the digital camera 100 of the present embodiment will be described with reference to a flowchart of FIG. 5.

In step S101, the main control unit 151 determines whether or not an image shooting switch included in the operation switch 156 is ON, ends the process if it is not determined to be ON, and proceeds to the process to step S102 if it is determined to be ON. In step S102, the main control unit 151 controls each unit, executes an image shooting process, and advances the process to step S103. The purpose of the image shooting process in step S102 is to generate an evaluation image, and image data for focus detection and image data for one screen are generated and stored in the RAM 154.

In step S103, the main control unit 151 controls the posture estimation unit 202 to execute a process of the above-described subject detection and estimation of the posture information of the detected subject. In step S104, the main control unit 151 controls the main subject determination unit 203 to execute a process of determining the main subject based on the above-mentioned posture information of the subject. By the main subject determination process, the image processing unit 152 notifies the main control unit 151 of the position and size of the main subject area. The main control unit 151 sets the focus detection area based on the notified main subject area.

In step S105, the main control unit 151 controls the focus control unit 133 to execute the focus detection process so as to focus on the main subject determined in step S104 based on the image data for focus detection obtained in step S102, and finds the drive amount and drive direction of the focus lens 131.

In step S106, the focus control unit 133 drives the focus motor 132 to move the focus lens 131 according to the drive amount and the drive direction obtained in step S105. In step S107, the main control unit 151 controls each part and performs image shooting process. The obtained image data is recorded in the image recording medium 157. The described above is the autofocus procedure of the image capturing apparatus in this embodiment.

According to the present embodiment as described above, by using the posture information of subjects, the accuracy of automatic determination of a main subject from a plurality of subjects can be improved. Further, since the main subject can be detected from an image of one frame, the release time lag can be shortened when shooting a still image, and the real-time property of detecting the main subject can be improved when shooting a moving image.

<Modification>

Figure 6:
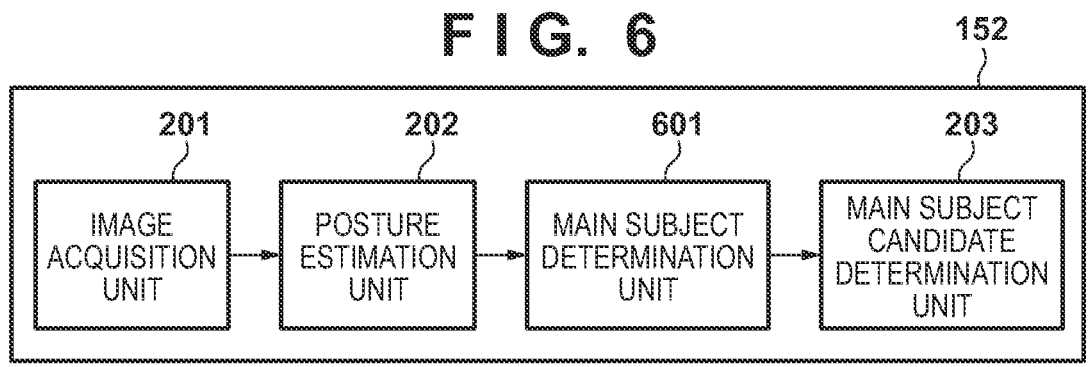
FIG. 6 is a block diagram showing a configuration example of an image processing unit according to one or more aspects of the present disclosure.

In the above-described embodiment, the main subject determination unit 203 determines the main subject based on the distances between the feature vectors of all the subjects detected by the posture estimation unit 202, but candidates of the main subject may be determined in advance using another determination method. FIG. 6 shows the configuration of the image processing unit 152 regarding the main subject determination in the latter case.

A main subject candidate determination unit 601 narrows down the candidates for the main subject to be determined by the main subject determination unit 203 from the subjects detected by the posture estimation unit 202. In the narrowing down by the main subject candidate determination unit 601, the candidates are determined based on the positions and sizes of the subjects. The position can be calculated as the center of the positions 301 and 302 which is the centers of the head in the example shown in FIG. 3, and the size can be calculated from the distance between the positions 301 and 302. A subject whose position is close to the center of the image and whose size is a predetermined size or larger is determined as a candidate for the main subject.

Then, among the candidates for the main subject determined by the main subject candidate determination unit 601, a subject having the sum of the distances between the feature vectors (maximum value of the equation (3) or the equation (4)) being equal to or more than a predetermined threshold value is selected as the main subject. If the sum of the distances between the feature vectors of all of the candidates are less than a predetermined threshold, then the main subject of the previous frame is selected as the main subject of the current frame, or the main subject is selected based on the position and size of the subject.

In the above example, the case where the main subject is determined using the posture information of a single frame has been described, but continuous frames or moving image may be read and the main subject may be determined using the time-series posture information. When the time-series posture information is used, the joint position information at each time may be used, or the joint position information at a certain time and the motion vector information of the joints or subjects may be used in combination. In addition, other information may be used instead or in combination with the above information as long as it represents time series information.

Further, in the above-described embodiment, the case where the result of the main subject determination is used for the focus control has been described. However, the present disclosure is not limited to focus control, and may be used for another image shooting control. For example, it may be used for exposure control or, if the sum of distances between the feature vectors of the subject determined as the main subject by the main subject determination unit 203 is equal to or greater than a predetermined threshold value, then the image shooting process may be started. This is because if the sum of distances between the feature vectors is equal to or greater than a predetermined threshold value, the probability that the subject has a peculiar posture and is in a decisive moment is high. Further, as another embodiment, if the sum of distances between the feature vectors is equal to or greater than a predetermined threshold value, then an image may be determined as an image of high importance and this information may be added to the captured image. By doing so, it can be expected to improve the searchability of images of high importance.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An image processing apparatus comprising:
    an acquisition unit that acquires image data;
    an estimation unit that detects a plurality of subjects from the image data and estimates likelihood of each of the plurality of subjects being a main subject based on posture information of the detected subjects; and
    a determination unit that determines a main subject from the plurality of subjects based on the likelihood of the each subject estimated by the estimation unit,
    wherein each unit is implemented by one or more processors.

2. The image processing apparatus according to claim 1, wherein the determination unit narrows down the plurality of subjects to candidate subjects that are to be subjected to determination of the main subject based on the likelihood of the each subject using a position and size of each subject.

3. The image processing apparatus according to claim 1, wherein the determination unit determines a subject having a most different posture using the likelihood of the each subject based on the posture information of the plurality of subjects as the main subject.

4. The image processing apparatus according to claim 1, wherein the determination unit determines the main subject based on the likelihood of the each subject estimated using a feature vector of the each subject obtained from the posture information of the plurality of subjects.

5. The image processing apparatus according to claim 4, wherein the determination unit determines the main subject based on the likelihood of the each subject estimated using distances between the feature vectors of the plurality of subjects and determines the subject having a largest distance as the main subject.

6. The image processing apparatus according to claim 4, wherein the determination unit determines the main subject based on the likelihood of the each subject estimated using distances between a center of a cluster of the feature vectors and the feature vectors, and determines the subject having a largest distance as the main subject.

7. The image processing apparatus according to claim 4, wherein the determination unit determines the main subject based on the likelihood of the each subject estimated using distances between the feature vectors of the plurality of subjects and determines the subject having a distance greater than a predetermined threshold as the main subject.

8. The image processing apparatus according to claim 4, wherein the determination unit determines the main subject based on the likelihood of the each subject estimated using distances between a center of a cluster of the feature vectors and the feature vectors, and determines the subject having a distance greater than a predetermined threshold as the main subject.

9. The image processing apparatus according to claim 4, wherein the subject is a human, the posture information incudes positions of predetermined joints, and the feature vector represents a vector from a predetermined position to the joints.

10. An image capturing apparatus comprising:
an image processing apparatus that includes:
an acquisition unit that acquires image data;
an estimation unit that detects a plurality of subjects from the image data and estimates likelihood of each of the plurality of subjects being a main subject based on posture information of the detected subjects; and
a determination unit that determines a main subject from the plurality of subjects based on the likelihood of the each subject estimated by the estimation unit;
an image sensing unit that outputs the image data; and
a focus adjustment unit that performs focus adjustment based on the image data within an area of the main subject determined by the determination unit,
wherein each unit is implemented by one or more processors.

11. The image capturing apparatus according to claim 10, further comprising an exposure control unit that performs exposure control based on the image data within the area of the main subject determined by the determination unit,
wherein the exposure control unit is implemented by one or more processors.

12. The image capturing apparatus according to claim 10, wherein recording of the image data is started in a case where distances between a feature vector of the main subject determined by the determination unit and feature vectors of the other subjects or a distance between the feature vector of the main subject and a center of a cluster of the feature vectors is a predetermined threshold or more.

13. The image capturing apparatus according to claim 10, wherein the larger distances between feature vector of the main subject determined by the determination unit and the feature vectors of the other subjects or a distance between the feature vector of the main subject and a center of a cluster of the feature vectors is, the higher the importance of an image including the main subject is determined as.

14. An image processing method comprising:
acquiring image data;
detecting a plurality of subjects from the image data and estimating likelihood of each of the plurality of subjects being a main subject based on posture information of the detected subjects; and
determining a main subject from the plurality of subjects based on the likelihood of the each subject.

15. A non-transitory computer-readable storage medium, the storage medium storing a program that is executable by the computer, wherein the program includes program code for causing the computer to execute an image processing method, the method comprising:
acquiring image data;
detecting a plurality of subjects from the image data and estimating likelihood of each of the plurality of subjects being a main subject based on posture information of the detected subjects; and
determining a main subject from the plurality of subjects based on the likelihood of the each subject.

* * * * *